US006405207B1

(12) United States Patent
Petculescu et al.

(10) Patent No.: US 6,405,207 B1
(45) Date of Patent: Jun. 11, 2002

(54) REPORTING AGGREGATE RESULTS FROM DATABASE QUERIES

(75) Inventors: Cristian Petculescu, Redmond; Amir Netz, Bellevue, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/418,805

(22) Filed: Oct. 15, 1999

(51) Int. Cl.7 .............................................. G06F 17/30
(52) U.S. Cl. ............................. 707/102; 707/1; 707/3; 707/5
(58) Field of Search .................... 707/3, 4, 5, 100, 707/102, 104.1, 200, 203, 1

(56) References Cited

U.S. PATENT DOCUMENTS

| | | | |
|---|---|---|---|
| 5,799,300 A | * 8/1998 | Agrawal et al. ................. | 707/1 |
| 5,890,151 A | * 3/1999 | Agrawal et al. ................. | 707/5 |
| 5,926,820 A | * 7/1999 | Agrawal et al. ............. | 707/200 |
| 5,943,668 A | * 8/1999 | Malloy et al. ................. | 707/3 |
| 6,003,036 A | * 12/1999 | Martin ........................ | 707/102 |
| 6,122,636 A | * 9/2000 | Malloy et al. .............. | 707/102 |
| 6,205,447 B1 | * 3/2001 | Malloy ........................ | 707/102 |

OTHER PUBLICATIONS

Stolte et al. (IEEE publication, Oct. 2000) discloses Ploaris: a system for query, analysis and visualization of multi-dimensional database, pp. 5–14. Stanford Univer, InforVis, 2000 Proced.*

Goil, et al. (IEEE publication, Apr. 1999) discloses design and implementation of a scalable parallel system for multi-dimensional analysis of OLAP, pp. 576–581 in Dept. of Elect. & Compt. Engineering, in Parallel and Distr. Proces., 1999.*

* cited by examiner

Primary Examiner—Diane D. Mizrahi
(74) Attorney, Agent, or Firm—Woodcock Washburn LLP

(57) ABSTRACT

A facility for multidimensional, multilevel databases has a query syntax for specifying that aggregate-data cells representing higher levels of the database in a report include only the data from certain ones of the lower-level database items, rather than from all of them. A database engine extracts data from the lower-level query items from the database, and aggregates only the data from those items into one or more aggregate cells in accordance with a function named in the query.

28 Claims, 9 Drawing Sheets

FIG. 4

| SALES | Ken | | | Leo | | |
|---|---|---|---|---|---|---|
| | | Ramona | Bill | | Tom | |
| Romãnia | 2000 | 1000 | 1000 | 6000 | 4000 | |
| Prahova | 1500 | 800 | 700 | 3000 | 2000 | |
| Cluj | 500 | 200 | 300 | 3000 | 2500 | |
| Napoca | 300 | 150 | 150 | 2000 | 1500 | |
| North America | 20000 | 14000 | 6000 | 12000 | 7000 | |
| USA | 10000 | 4000 | 6000 | 4000 | 3000 | |
| CA | 3000 | 1400 | 1600 | 1000 | 500 | |
| Canada | 7000 | 3400 | 3600 | 5000 | 2000 | |
| BC | 7000 | 3400 | 3600 | 5000 | 2000 | |

FIG. 5

| SALES | Ken | | | Total Leo | |
|---|---|---|---|---|---|
| | | Ramona | Bill | | Tom |
| Total România | 1800 | 950 | 850 | 3500 | 3500 |
| Prahova | 1500 | 800 | 700 | 2000 | 2000 |
| Total Cluj | 300 | 150 | 150 | 1500 | 1500 |
| Napoca | 300 | 150 | 150 | 1500 | 1500 |
| Total NAmerica | 10000 | 4800 | 5200 | 2500 | 2500 |
| Total USA | 3000 | 1400 | 1600 | 500 | 500 |
| CA | 3000 | 1400 | 1600 | 500 | 500 |
| Canada | 7000 | 3400 | 3600 | 2000 | 2000 |
| BC | 7000 | 3400 | 3600 | 2000 | 2000 |

REPORTING AGGREGATE RESULTS FROM DATABASE QUERIES

TECHNICAL FIELD

The present invention relates to electronic data processing, and more particularly concerns database mechanisms for retrieving combined or aggregated data.

BACKGROUND

Many databases of interest to businesses and other users contain data that is multidimensional and that has multiple levels in some or all of the dimensions. For example, a business might wish to organize sales data by geographic location, by management structure, and by measures. The locations dimension might have levels representing global regions, countries, provinces/states, and cities. The management dimension might have levels denoting upper management, lower management, and field offices. Measures might include sales volumes and amounts.

Users rarely wish to see all the data in a database. Instead, they query the database to extract certain portions of it into a report, table, or other result. A report from a multidimensional database often contains data taken from multiple levels along one or more of its axes or dimensions. Although report entries or cells from the lowest levels might correspond to data taken directly from the stored database, other report cells might contain values representing combinations of the individual data at lower database levels. A typical report might ask for sales volumes for certain cities in selected provinces and countries, along with totals for the provinces and countries in which the cities are located. Cells containing combined data from lower-level database data are known as aggregate cells. Database systems have long provided facilities for aggregating the data values of a number of specified database items into a single cell of a report. The Structured Query Language (SQL) database language, for instance, permits a query to specify the value of a table entry or cell as a sum, average, count, etc. of specified data items in a database.

More recently, database systems such as the Microsoft® SQL Server from Microsoft Corp. have included facilities for including aggregate cells in reports from multidimensional, multilevel databases. The Online Analytic Processing (OLAP) Services feature of this server permits a user to specify that a certain report cell is to contain, e.g., the sales volume of an entire country, while other cells in the same report contain sales volumes for individual provinces and/or cities of that country.

Such OLAP aggregate cells, however, always report the combination of all data items from lower levels, even when less than all of the lower-level items appear in the report. In the preceding example, the aggregate cell always contains the sales volume for all provinces and cities of the selected country, even when only a few of the individual provinces and/or cities are selected for inclusion in the report.

Sometimes, however, a user wishes to see data values for a higher level that represent the aggregate of only those cells that the query specifies for the lower levels. That is, for truncated hierarchies, data should aggregate only to the extent that their descendants or other components are included in the report generated from a query specification. Conventional database systems are inflexible in this regard. A query can only select all or nothing.

A need therefore exists for a database system facility for permitting a query to select the range of data for higher levels of a database from less than all of the data at the lower levels.

SUMMARY OF THE INVENTION

The present invention offers a facility for multiple-level database systems that permits a query or other input to specify a "what you see is what you get" kind of aggregate entry or cell in a report, where the aggregate value represents only the lower-level data or components that are also specified in the query. Such a facility furthers the basic concept of a database in selecting only certain data from a database, by extending that concept to higher levels of a multi-level database as well.

This facility, called 'visual totals', receives a query or other input specifying a visual total for certain data, assembles certain data from the database into base cells representing direct data from the database, and aggregates data only from the specified contributors into an aggregate cell representing higher-level data in a report. A visual total is a partial aggregate of the lower-level descendants of a higher-level node at any level of a database. A report form a query including a visual-totals specification includes data for a database node at a higher level that is not aggregated from all of the descendents of that node, but rather only from those 'contributor' nodes at a lower level that are explicitly designated in the query. Stated another way, for truncated hierarchies, data should aggregate only to the extent that their descendants or other components are included in the report generated from a query specification. An aggregation can be any combination or function of data items at lower levels of the database hierarchy that includes a higher-level node specified in a query.

DRAWINGS

FIG. 4 shows an example report from the database fragment of FIG. 3.

FIG. 5 modifies the report of FIG. 3 with certain cells representing visual totals according to the invention.

Figure 6:
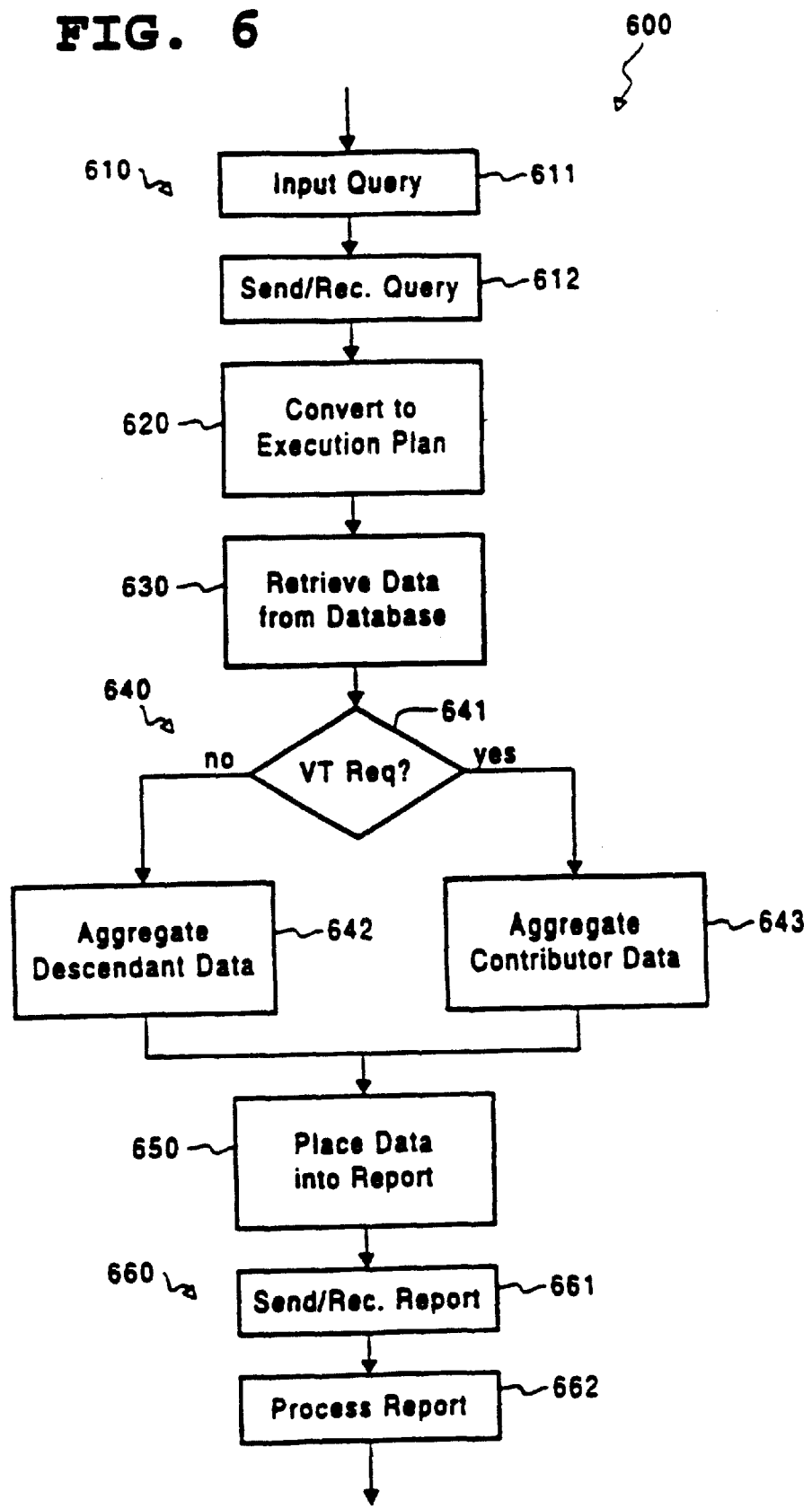

FIG. 6 is a flowchart of an overall method for carrying out the invention.

Figure 7:
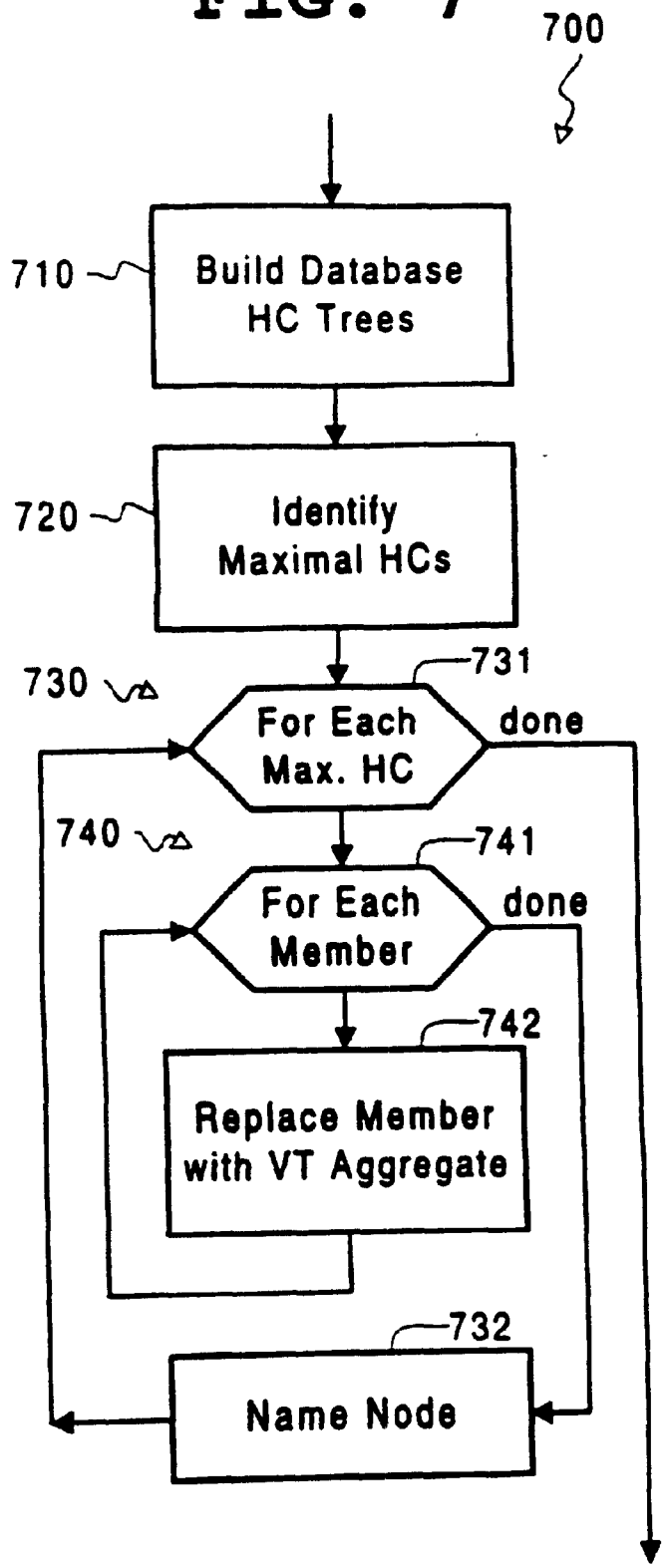

FIG. 7 details a data-aggregation procedure for FIG. 6.

Figure 8:
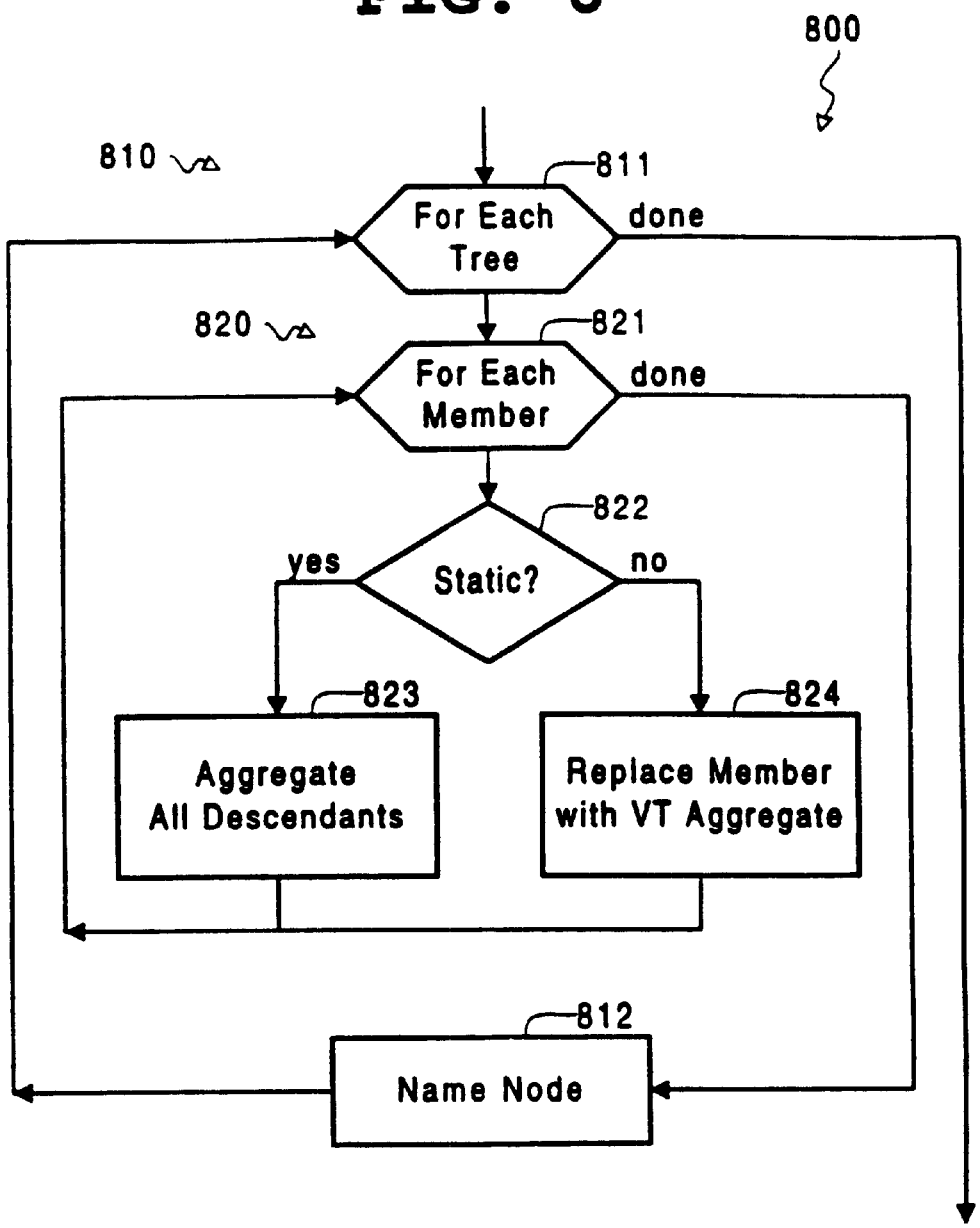

FIG. 8 shows an alternative data-aggregation procedure for FIG. 6.

DETAILED DESCRIPTION

This description and the accompanying drawing illustrate specific examples of embodiments in which the present invention can be practiced, in sufficient detail to allow those skilled in the art to understand and practice the invention. Other embodiments, including logical, electrical, and mechanical variations, are within the skill of the art. Skilled artisans will also recognize features and advantages of the invention other than those explicitly set forth. The scope of the invention is to be defined only by the appended claims, and not by the specific embodiments described below.

Environment

Figure 1:
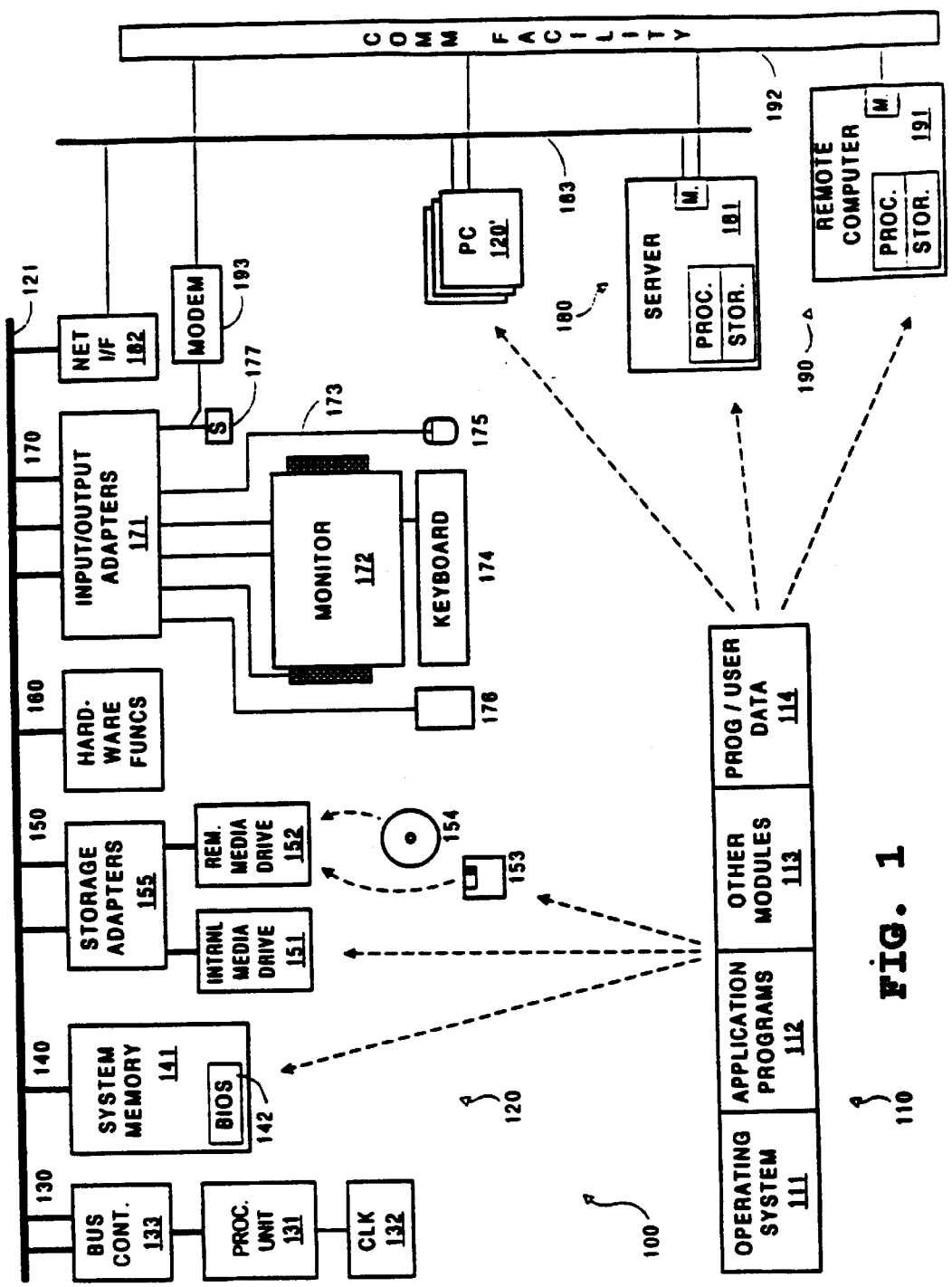
FIG. 1 is a block diagram of a system serving as an environment for practicing the invention.

FIG. 1 is a high-level diagram of an illustrative environment 100 having software 110 and hardware 120 for hosting the invention as executable instructions, data, and/or electronic and mechanical components. Other suitable environments, and variations of the described environment are also possible.

Hardware components 120 are shown as a conventional personal computer (PC) including a number of components coupled together by one or more system buses 121 for carrying instructions, data, and control signals. These buses may assume a number of forms, such as the conventional ISA, PCI, and AGP buses. Some or all of the units coupled to a bus can act as a bus master for initiating transfers to other units. Processing unit 130 may have one or more microprocessors 131 driven by system clock 132 and coupled to one or more buses 121 by controllers 133. Internal memory system, 140 supplies instructions and data to processing unit 130. High-speed RAM 141 stores any or all of the elements of software 110. ROM 142 commonly stores basic input/output system (BIOS) software for starting PC 120 and for controlling low-level operations among its components. Bulk storage subsystem 150 stores one or more elements of software 110. Hard disk drive 151 stores software 110 in a nonvolatile form. Drives 152 read and write software on removable media such as magnetic diskette 153 and optical disc 154. Other technologies for bulk storage are also known in the art. Adapters 155 couple the storage devices to system buses 121, and sometimes to each other directly. Other hardware units and adapters, indicated generally at 160, may perform specialized functions such as data encryption, signal processing, and the like, under the control of the processor or another unit on the buses.

Input/output (I/O) subsystem 170 has a number of specialized adapters 171 for connecting PC 120 to external devices for interfacing with a user. A monitor 172 creates a visual display of graphic data in any of several known forms. Speakers 173 output audio data that may arrive at an adapter 171 as digital wave samples, musical-instrument digital interface (MIDI) streams, or other formats. Keyboard 174 accepts keystrokes from the user. A mouse or other pointing device 175 indicates where a user action is to occur. Block 176 represents other input and/or output devices, such as a small camera or microphone for converting video and audio input signals into digital data. Other input and output devices, such as printers and scanners commonly connect to standardized ports 177. These ports include parallel, serial, SCSI, USB, FireWire, and other conventional forms.

Personal computers frequently connect to other computers in networks. For example, local area network (LAN) 180 connect PC 120 to other PCs 120' and/or to remote servers 181 through a network adapter 182 in PC 120, using a standard protocol such as Ethernet or token-ring. Although FIG. 1 shows a physical cable 183 for interconnecting the LAN, wireless, optical, and other technologies are also available. Other networks, such as wide-area network (WAN) 190 can also interconnect PCs 120 and 120', and even servers 181, to remote computers 191. Computers 181 and 191 have processors, storage, and communications equipment similar to those of PC 120, although usually of higher capacity. FIG. 1 illustrates a communications facility 192 such as a public switched telephone network for a WAN 190 such as an intranet or the internet. PC 120 can employ an internal or external modem 193 coupled to serial port 177. Other technologies such as packet-switching ISDN, ATM, DSL, frame-relay are also available. In a networked or distributed-computing environment, some of the software 110 may be stored on the other peer PCs 120', or on computers 181 and 191, each of which has its own storage devices and media.

Software elements 110 may be divided into a number of types whose designations overlap to some degree. For example, the previously mentioned BIOS sometimes includes high-level routines or programs which might also be classified as part of an operating system (OS) in other settings. The major purpose of OS 111 is to provide a software environment for executing application programs 112 and for managing the resources of system 100. An OS such as Microsoft® Windows® or Windows NT® commonly implements high-level application-program interfaces (APIs), file systems, communications protocols, input/output data conversions, and other functions.

Application programs 112 perform more direct functions for the user. A user normally calls them explicitly, although they can execute implicitly in connection with other applications or by association with particular data files or types. Modules 113 are packages of executable instructions and data which may perform functions for OSs 111 or for applications 112. Dynamic link libraries (.dll) and class definitions, for instance, supply functions to one or more programs. Data 114 includes user data of all types, data generated and/or stored by programs, and digital data that third parties make available on media or by download for use in computer 120.

Figure 2:
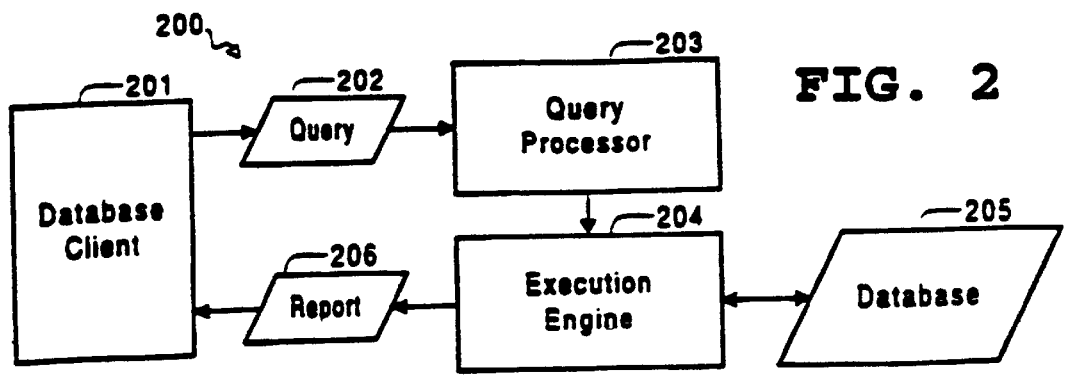
FIG. 2 is a block diagram of a database system for carrying out the invention.

FIG. 2 is an illustrative database system 200 that can be implemented in environment 100. Database client 201 includes facilities for a user to input a specification of data to be provided from a database, and to display or otherwise process data matching the specification. Block 201 sends a query 202 containing the data specification to query processor 203, where it is parsed and converted into a sequence of operations for obtaining the specified data. Execution engine 204 carries out the sequence of operations for retrieving the proper data from database 205, and for assembling it into a report 206 containing formatted data matching the query specification.

A typical system 200 has multiple clients 201 implemented as software modules stored in and executing upon PCs 120, FIG. 1. Components 203–205 typically reside in and execute upon one or more central computers such as 181 and 191. It is certainly possible, however, to implement the invention on a system having all of the components located in a single computer or distributed in any convenient fashion across multiple computers or in a multi-level system such as the three-tier architecture commonly found in applications based in the World Wide Web.

The publicly available Microsoft SQL Server database system from Microsoft Corp. includes a technology named on-line analytic processing (OLAP). OLAP technology facilities for analyzing multidimensional data having three or more dimensions from a relational database engine such as Microsoft SQL Server. Other conventional database systems, employing relational, hierarchical, and other organizations, can also provide multidimensional data that can be processed according to the invention. Modems or similar network adapters and communications devices transmit and receive queries 202 and reports 206 over any kind of network.

Visual Totals

Figure 3A:
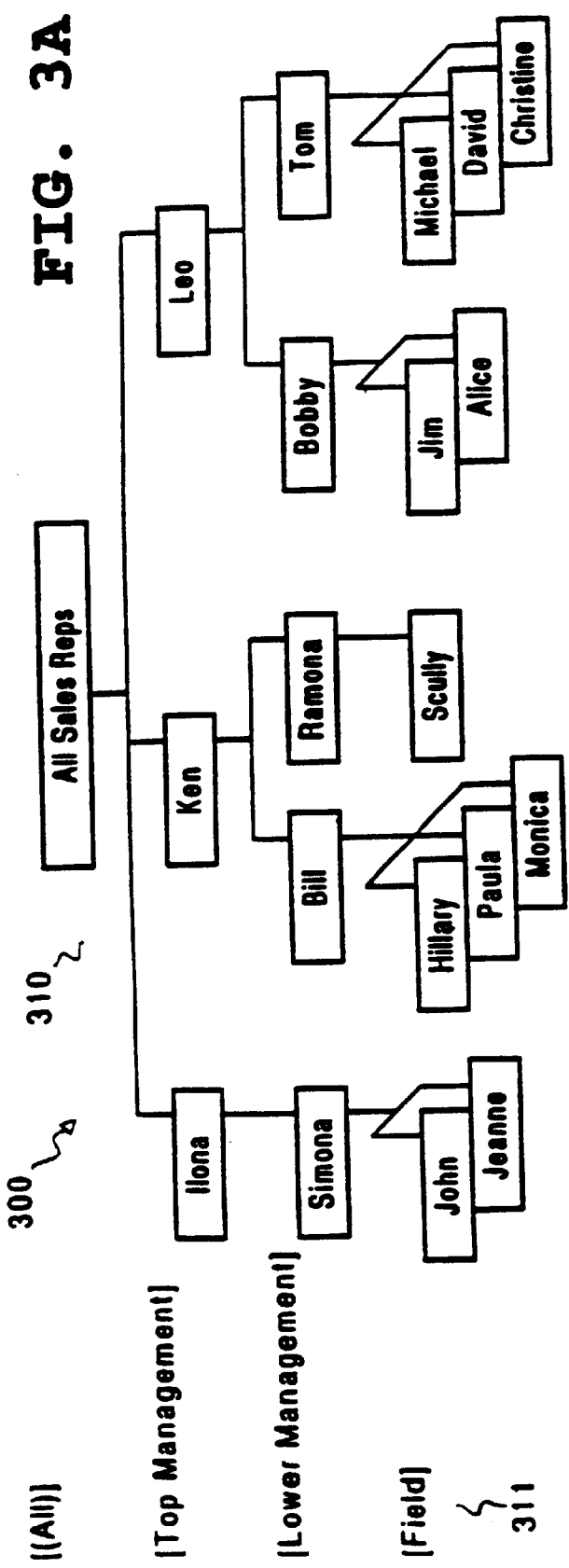
FIG. 3 is a schematic diagram of an example multidimensional database fragment, viewed along different axes in FIGS. 3A and 3B.
Figure 3B:
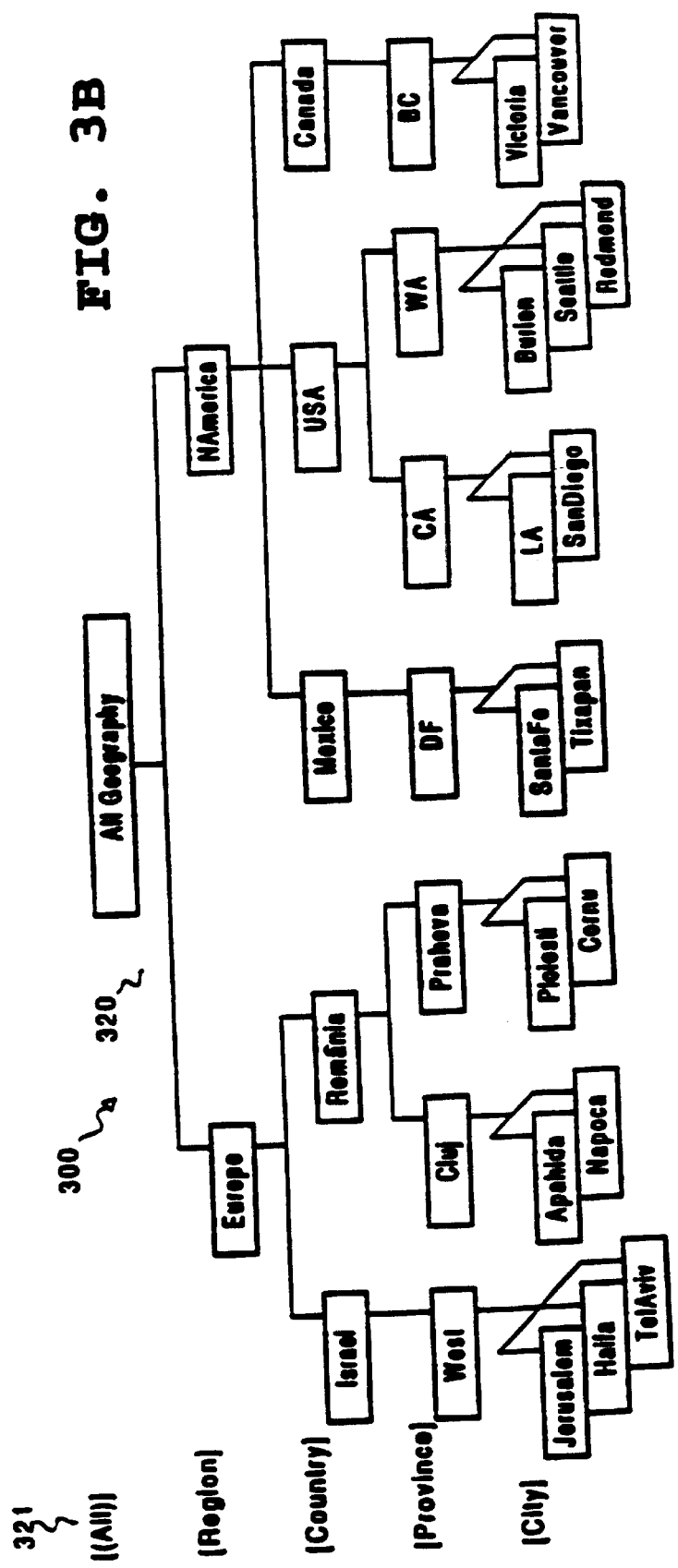

FIGS. 3A and 3B show an example database fragment 300 that will be carried throughout the following description to illustrate the operation of the invention. OLAP systems hierarchically organize the metadata associated with the database data into a number of dimensions. The example supposes a structure that includes a Sales Representatives dimension having a number of people's names, a Geography dimension having a number of locations, and a Measures dimension containing monetary sales amounts for a given period of time. The Sales-Reps dimension 310 has four hierarchical levels 311: 'All', 'Top Management', 'Lower Management', and 'Field', as shown at the left side of FIG. 3A. A node or member at any level can have any number of child nodes or members at the next lower level, and so on for descendants at further levels. The 'All' level has a single root node. The 'Field' level contains leaf nodes holding actual data such as sales volumes. Leaves holding data can, however, occur at any level in the general case. The 'Geography' dimension 320 has five levels, as shown in FIG. 3B: 'All' (root node), 'Region', 'Country', 'Province', and 'City' (leaf nodes). The 'Measures' dimension, not shown in FIG. 3, has two components: 'Sales' and 'Volume'. Any leaf or elementary cell is identified by these metadata of the dimensions. A data node in a database structure is identified by its coordinates in each of the dimensions. For example, the sales amount for Jeanne in Santa Fe is identified by Sales Reps={Top Management=Ilona, Lower Management= Simona, Field=Jeanne}, Geography={Region=North America, Country=Mexico, Province=DF, City=Santa Fe}, Measure=Amount.

FIG. 4 shows a two-dimensional table containing an illustrative report 400 resulting from a query on the database of FIGS. 3A and 3B. Reports might have any number of dimensions. The data cells of a report are of two types. A base cell contains data either directly from a database node or derived therefrom. For example, a cell that contains a sales amount for Jeanne in Santa Fe is a base cell, sometimes called an OLAP 'fact'. Aggregate cells are constructed by applying some type of aggregation function to data from a number of database nodes. A cell representing a sales amount for Bobby in Napoca, or for Ken in North America, are aggregate cells, sometimes called synthesized cells. Aggregate cells are characterized in that at least one of their dimension coordinates ends at a non-leaf node or intermediate level.

Report 400 specifies some base cells and some aggregate cells in data cells 410, enclosed by a heavy line in FIG. 4. Header cells provide conventional names 420 for the columns and 430 for the rows of the report. When the query that requests report 400 specifies a higher-level cell and also includes less than all its descendants, the aggregated data values in the lower-level cells do not correspond to the data values in the associated higher-level cells. For example, in the column for Sales Representative=Ken, the value in the cell labeled North America is not the sum of the two components listed in the report, USA and Canada, that is, $20,000≠$10,000+$7,000. The value for Mexico, $3,000, is included in the aggregate cell value, even though Mexico was not included in the specification for the report. The same is true for some of the columns of the report.

Sometimes, however, a user wishes to see 'visual totals'—data values for a higher level that represent the aggregate of only those cells that the query specifies for the lower levels, when less than all the descendent cells of the higher level are included in the query. That is, for truncated hierarchies, data should aggregate only to the extent that their descendants or other components are included in the report generated from a query specification.

The invention permits a user to request one or more such visual totals in an OLAP query in the following manner, FIG. 5 shows a report 500 where a query similar to that for report 400 designates some of the aggregate-cell specifications as visual totals (VT) according to the invention. For purposes of illustration, these cells are symbolized by bold-face type in data cells 510. The value for Sales Rep=Ken for Country=USA now decreases from $10,000 to $3,000, because only the contribution from Province=CA is included in the report specification. The value for Region=North America goes from $20,000 to $10,000=$3,000+$7,000, because only the countries USA and Canada now contribute to the aggregate cell. Visual-total aggregate cells can occur across multiple dimensions of the database. In report 500, the data value for the cell where Sales Rep={Top Management=Leo}, Geography={Region=Europe, Country=Romania} has been doubly reduced: less than all of Leo's lower management is included, and Apahida is omitted from Romania's descendants. Report 500 employs a convention, however, that omitting all of the descendents of a level from the specification signifies that all descendants are to be aggregated into that cell. For example, the aggregate cells for the Prahova province exhibit the sums of the corresponding values for both of its component cities Ploiesti and Cornu. Column names 520 and row names 530 include the designation "Total" to indicate that they represent visual totals rather than absolute totals as in report 400. Any type of marking can designate visual-total names; or, if no confusion would result, marking can be omitted.

Report 500 draws a distinction between two terms: The 'descendants' of a given node or member are all the nodes below the given node, while the 'contributors' of the node include only those descendants that actually contribute their values to a visual total in a particular table. The 'children'of the given node are the immediate descendants of a node. It should be noted that the contributors of a visual-total aggregate cell might not include any child nodes at all, but might still include some or all descendants at lower levels. In fact, if all grandchildren of a node are included, the visual total for an aggregate cell still equals the absolute total for that cell even though none of the children are present, because the contribution of all the grandchildren is the same as that of all the children of the node. This result generalizes for descendants at any level or combination of levels.

FIG. 6 is a flowchart 600 of an overall method for providing data that might include visual totals. In blocks 610, a user (or a program or some other entity) inputs a query 202, (FIG. 2) in block 611 and sends it to query processor 203 in block 612. In block 620, the processor converts the query into a plan by parsing it and generating a sequence of operations for execution engine 204. Block 630 causes engine 204 to retrieve the relevant data from database 205.

During execution, blocks 640 perform any aggregation requested in the query. Block 641 detects the type of any aggregation. If an aggregation is a conventional one, block 642 aggregates data for all descendents of the specified node or member. For an aggregation specified to be a visual total, however, block 643 aggregates only that data from the contributor nodes explicitly designated in the query.

Block 650 places both direct and aggregated data into formatted cells of report 206 according to specifications in query 202. Blocks 660 output the report. Block 661 sends it to the client 201, where it is received and processed as desired in block 662. Block 662 might, for example, display or print the report, or might perform further operations upon it.

FIGS. 7 and 8 flowcharts of more detailed methods for aggregating data for a visual total according to block 643, FIG. 6. If a query includes multiple visual totals, these methods execute once for every such VT specification in the query.

As mentioned previously, the particular system described herein employs data structured in OLAP sets that (unlike strict mathematical sets) can contain duplicate members, and that preserve the order of the members. In the description that follows, the term 'set' designates an OLAP set unless otherwise indicated. Other types of data, such as SQL relations or normal mathematical sets, can be easily substituted if desired. The invention also defines a number of other terms involving members m of a set S. Because the definitions are couched in the language of set theory rather than that of graph theory, the database nodes of the previous discussion are usually referred to as 'members'. Unless otherwise indicated, a member can be a node at any level in any dimension of the database.

- The 'hierarchical context' $HC_s(m)$ of member m in set S is the contiguous subset of S, starting with m and continuing in consecutive order through all the descendants of m in S. In table 400, for example, $HC_{row}$ ([Romania]) is the subset {Romania, Prahova, Cluj, Napoca}, and $HC_{row}$([Cluj]) is {Cluj, Napoca}.
- The member m of a hierarchical context is the 'determinant' $\Delta HC_s(m)$ of the context. The determinant of the first HC is $HC_{row}$([Romania])=[Romania].
- The 'hierarchical D-context' $HD_s(m)$ of member m is $HC_s(m)$ with member m excluded.
- A 'maximal' hierarchical context $HC_s(m)$ if there is no m' in S such that $HC_s(m')$ is included in $HC_s(m)$. Using the symbol $\Sigma$ to denote the set juxtaposition operator, which builds the juxtaposition of the members of a number of sets, $S=\Sigma HC_s(m)$. Because the HCs are defined as mathematical trees, set S is thus a forest.
- Member m' is a 'contributor' to m in S iff it is the determinant of a maximal HC of the set $HD_s(m)$. The set of all contributors to m in S is denoted $C_s(m)$.
- The 'visual total' $VT_s(m)$ of member m is calculated as the aggregate of the visual totals of all contributors to member m in set S. This definition is recursive. If a member m' has no contributors, then $VT_s(m')=m'$
- A 'static member' m is any member of S that satisfies the relation $VT_s(m)=m$. A necessary and sufficient condition for a member to be static is that all its contributors be static, and that the juxtaposition of its contributors have a contribution to the aggregate of the member identical to the aggregate of the juxtaposition of all its descendants.

FIG. 7 shows method 700 for aggregating data into a visual total according to block 643, FIG. 6. Block 710 builds all the HC trees of the data nodes or members. That is, it constructs a data structure that includes explicit parent/child relationships among each tree in the database forest. Block 720 identifies all the maximal HCs, as defined above, in the trees of the forest. Blocks 730 iterate over all the maximal HCs, selected in block 731. Block 732 gives the appropriate name to each tree, as exemplified by names 520 and 530 in the report of FIG. 5.

Within each tree, inner loop 740 performs an aggregation. Block 741 visits each node or member recursively, starting from the lowest database tree levels. At each member, block 742 combines the data into a partial aggregation according to the specified aggregation function, such as a sum, an average, a count, etc. In the language of the above definitions, for every m in $\Delta HC_s(m)$, blocks 740 replace the data of m with $VT_s(m)=Agg(VT_s(c_i)$ for all i={1, . . . , $C_s(m)$}. 'Agg' is used here as a generic name for any desired aggregation function.

Method 700 is conceptually simple, and can be appropriate where queries might specify multiple visual totals and/or where only a few members contribute to the totals. On the other hand, it requires great amounts of computation for databases of large size. In many applications, queries typically specify that most of the members have a complete set of contributors—that is, all of a node's descendants contribute to the total in an aggregate cell of the report.

FIG. 8 shows an alternative method 800 for aggregating data into a visual total according to block 643. This method reduces calculation greatly by bypassing static members, as defined above. It also avoids building the database trees in advance, farther increasing execution speed. Loop 810 iterates over all the trees of the database forest, via block 811. Block 812 names the nodes in the same manner as block 732, FIG. 7.

Inner loop 820 iterates over each tree. Instead of performing a recursive search, however, block 821 employs a conventional top-down traversal algorithm. Block 822 detects whether the current member is a static member, as defined above. If so, block 823 combines the data from all descendants of the member in accordance with the aggregating function. Only if the member is not static does block 824 need to perform the calculations described above for block 742. When only a few of the members are not static, most of the calculation is therefore avoided.

Conclusion

The present invention can aggregate data from a multi-level database in a way that includes in a higher level only that data which is explicitly requested from lower levels. The invention includes systems and methods for accomplishing this goal. Although the embodiments described hereinabove are representative, many variations in structural and procedural form are within the skill of the art, and therefore within the scope of the appended claims.

Although the aggregation concept has been given the name 'visual totals', it is apparent that any aggregation function can be used in place of arithmetic addition. For example, averaging and counting are possible functions, as is logical union. Also, the data produced by the invention obviously need not be in the form of a visual or displayed report; reports containing VT data can be in any format or form, and can be processed in the same manner as other query results or sets of database data.

What is claimed is:

1. A method for providing data in a report from a database having members at multiple hierarchical levels, the method comprising:

receiving a query containing a specification for data from one or more members at a higher of the database levels, the specification including a designation of one or more of the members at a lower of the levels, the members at the lower level being less than all the descendants of the member at the higher level;

placing the retrieved data into one or more base cells of the report;

aggregating the data from the designated lower-level members only;

placing the aggregated data into an aggregated cell of the report.

2. The method of claim 1 where the database has multiple dimensions.

3. The method of claim 2 where the query contains multiple specifications along different ones of the dimensions.

4. The method of claim 1 where aggregating the data comprises:

building a plurality of hierarchical context trees for the database;

identifying the maximal hierarchical contexts of the trees;

iterating recursively through each of the maximal hierarchical contexts and through each member thereof; and replacing each of the members with an aggregate of the data of its designated lower-level members.

5. The method of claim 1 where aggregating the data from the base cells comprises:

iterating through multiple trees representing the database;

iterating through the members of each tree;

for at least one of the members, identifying the designated lower-level members of the one node; and replacing the value of the one member with an aggregate of the data of its designated lower-level members.

6. The method of claim 1 where aggregating the data further comprises:

identifying static members of the tree during the iteration; and for each static member, aggregating the value of all descendant members of the one member.

7. The method of claim 6 where aggregating the data further comprises:

identifying members of the tree that are not static members; and for each such non-static member, aggregating the value of only those of the descendant members designated in the query.

8. A medium bearing instructions and data for causing a suitably programmed digital computer to carry out the method of claim 1.

9. A method for producing a report from a database having multiple levels, the method comprising:

receiving a query containing a specification of a visual total;

assembling certain database data designated in the query into a plurality of base cells in the report; and aggregating the data from only the base cells into at least one aggregated cell in the report.

10. The method of claim 9 where the specification includes:

a designation of at least one database member at a higher of the database levels;

a designation of one or more contributor members at a lower of the levels; and an indication that the aggregated cell is to contain data only from the contributor members.

11. The method of claim 10 where the certain data is associated with the contributor members.

12. The method of claim 9 where aggregating the data comprises:

building a plurality of hierarchical context trees for the database;

identifying the maximal hierarchical contexts of the trees;

iterating recursively through each of the maximal hierarchical contexts and through each member thereof; and replacing each of the members with an aggregate of the data of its contributor members.

13. The method of claim 9 where aggregating the data from the base cells comprises:

iterating through the members of at least one tree representing the database;

for at least one of the members, identifying the contributor members of the one node; and replacing the value of the one member with an aggregate of the data of its contributor members.

14. The method of claim 13 where the iteration is a non-recursive traversal of the one tree.

15. The method of claim 13 where aggregating the data further comprises:

identifying static members of the tree during the iteration; and for each static member, aggregating the value of all descendant members of the one member.

16. The method of claim 15 where aggregating the data further comprises:

identifying members of the tree that are not static members; and for each such non-static member, aggregating the value of only those of the descendant members designated in the query.

17. The method of claim 15 where identifying static members comprises determining that all descendants of one of a member are static.

18. A medium bearing representations of instructions and data for causing a suitably programmed digital computer to carry out the method of claim 9.

19. A query for requesting a report containing data from a multiple-level database, the query including:

a designation of at least one database member at a higher of the database levels;

a designation of one or more contributor members at a lower of the levels; and an indication that the aggregate cell is to contain data only from the contributor members.

20. The query of claim 19 where the contributor members constitute less than all of the descendant members of the database member at the higher level.

21. A report containing data derived form a multiple-level database, the report including:

a plurality of base cells containing data from specified members at a lower level of the database; and at least one aggregate cell representing a member at a higher level of the database, and containing data derived only from the specified members at the lower level.

22. The report of claim 21 further comprising a plurality of names, one of the names having a designation identifying the aggregate cell.

23. A system for providing data to a client, comprising:

a database having members at multiple levels;

a query processor for converting a specification requesting a visual total into a plan for producing a report including at least one aggregate cell containing the visual total;

an execution engine responsive to the plan for retrieving data from the database into a plurality of base cells designated in the specification and for aggregating data from only the base cells into at least one aggregated cell in the report.

24. The system of claim 23 where the execution engine iterates through the members of at least one tree representing the database, for at least one of the members, identifies the contributor members of the one node, and replaces the value of the one member with an aggregate of the data of its contributor members.

25. A computer server for providing a report to a user, comprising:

a storage for holding a database having multiple levels;

communications equipment for receiving over a network a specification requesting a visual total from the database;

a processor for assembling data from the database into a plurality of base cells designated in the specification and for aggregating data from only the base cells into at least one aggregated cell in the report.

26. A medium bearing representations of instructions and data for causing a suitably programmed digital computer to carry out a method for producing a report from a database having multiple levels, the method comprising:

receiving a query containing a specification of a visual total;

assembling database data designated in the specification into a plurality of base cells in the report; and aggregating the data from only the base cells into at least one aggregated cell in the report.

27. The medium of claim 26 where the representations are manifestations in a digital storage.

28. The medium of claim 26 where the representations are signals in a communications channel.

* * * * *

UNITED STATES PATENT AND TRADEMARK OFFICE
CERTIFICATE OF CORRECTION

PATENT NO.     : 6,405,207 B1
DATED          : June 11, 2002
INVENTOR(S)    : Christian Petculescu and Amir Netz It is certified that error appears in the above-identified patent and that said Letters Patent is hereby corrected as shown below:

<u>Column 8,</u>
Line 11, after "advance" please replace "farther" with -- further --.

Signed and Sealed this

Third Day of September, 2002

Attest:

Attesting Officer

JAMES E. ROGAN
*Director of the United States Patent and Trademark Office*